United States Patent
Kim

(10) Patent No.: US 8,484,633 B2
(45) Date of Patent: Jul. 9, 2013

(54) METHOD OF UPGRADING PROGRAM OF PORTABLE DEVICE AND PORTABLE DEVICE HAVING PROGRAM UPGRADE FUNCTION

(75) Inventor: Jeong-Ho Kim, Seongnam (KR)

(73) Assignee: KT Corporation, Kyeonggi-Do (KR)

( * ) Notice: Subject to any disclaimer, the term of this patent is extended or adjusted under 35 U.S.C. 154(b) by 1100 days.

(21) Appl. No.: 12/078,136

(22) Filed: Mar. 27, 2008

(65) Prior Publication Data

US 2008/0301671 A1 Dec. 4, 2008

(30) Foreign Application Priority Data

May 28, 2007 (KR) .................. 10-2007-0051317

(51) Int. Cl.
*G06F 9/44* (2006.01)

(52) U.S. Cl.
USPC ........... 717/168; 717/171; 717/172; 455/418; 455/419; 455/41.2; 709/248

(58) Field of Classification Search
USPC .................. 717/168–178; 455/418–419, 445, 455/41.2
See application file for complete search history.

(56) References Cited

U.S. PATENT DOCUMENTS

| | | | |
|---|---|---|---|
| 6,275,694 B1 * | 8/2001 | Yoshida et al. | 455/419 |
| 6,754,895 B1 * | 6/2004 | Bartel et al. | 717/171 |
| 7,184,759 B2 * | 2/2007 | Date et al. | 455/419 |
| 7,844,721 B2 * | 11/2010 | Lee et al. | 709/230 |
| 2002/0086688 A1 * | 7/2002 | Kang | 455/466 |
| 2004/0117785 A1 * | 6/2004 | Kincaid | 717/170 |
| 2004/0143652 A1 * | 7/2004 | Grannan et al. | 709/223 |
| 2007/0037605 A1 * | 2/2007 | Logan | 455/567 |
| 2007/0072599 A1 * | 3/2007 | Romine et al. | 455/423 |

OTHER PUBLICATIONS

Lam et al. "Efficient Synchronization for Mobile XML Data." Sep. 23, 2002.*

* cited by examiner

*Primary Examiner* — Lewis A Bullock, Jr.
*Assistant Examiner* — Tina Huynh
(74) *Attorney, Agent, or Firm* — Harness, Dickey & Pierce P.L.C.

(57) ABSTRACT

Provided are a method, and a portable device having a program upgrade function. A method of upgrading a program of a portable device upgrades a program, such as a navigation program or firmware of the portable device, using another portable device within a predetermined range. Program upgrade can be performed between portable devices in movement, that is, it is possible to upgrade a program of a portable device regardless of a place in which the portable devices are located.

18 Claims, 9 Drawing Sheets

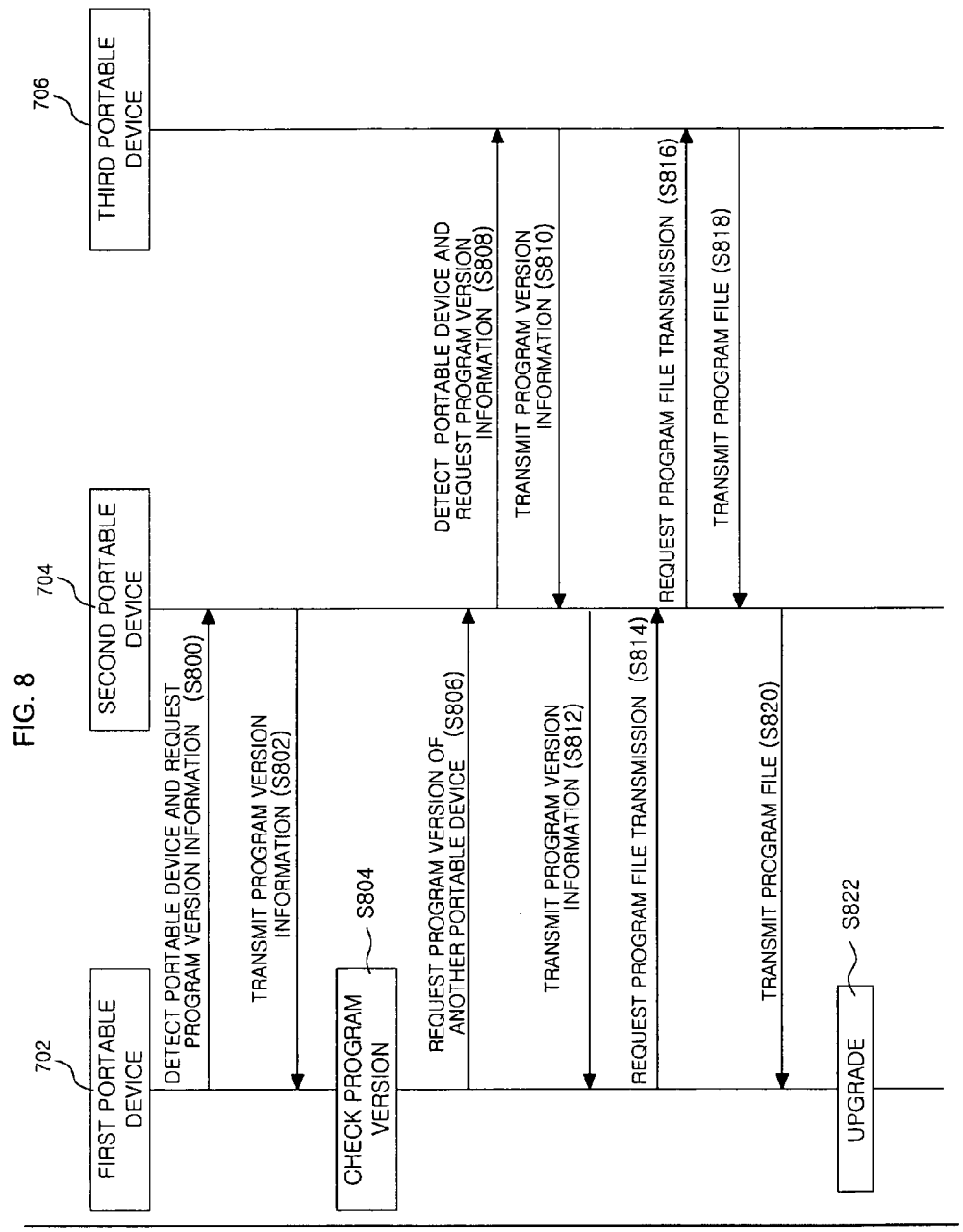

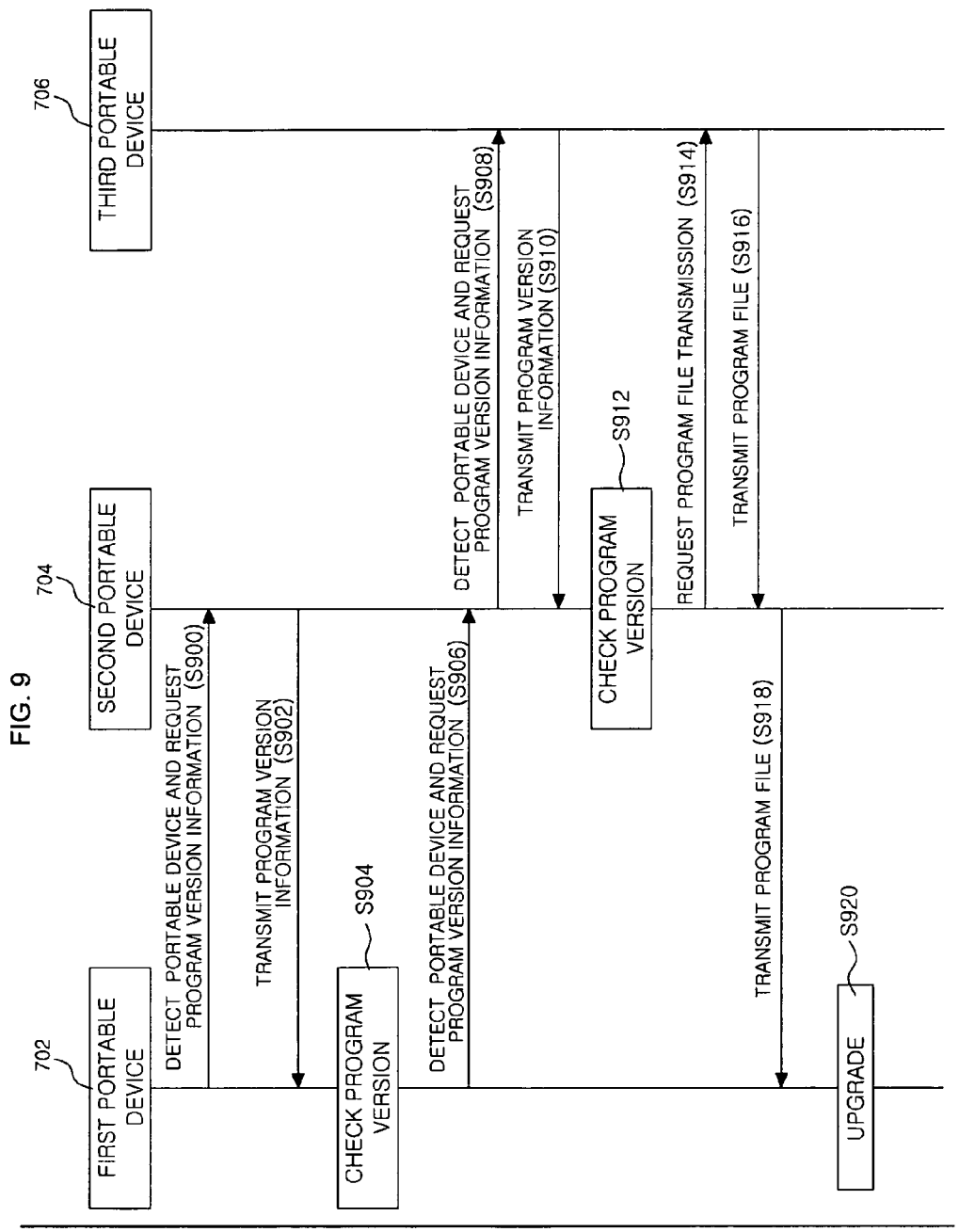

METHOD OF UPGRADING PROGRAM OF PORTABLE DEVICE AND PORTABLE DEVICE HAVING PROGRAM UPGRADE FUNCTION

CROSS-REFERENCE TO RELATED APPLICATION

This application claims priority to and the benefit of Korean Patent Application No. 2007-51317, filed May 28, 2007, the disclosure of which is incorporated herein by reference in its entirety.

BACKGROUND

1. Field of the Invention

The present invention relates to methods of upgrading a program of a portable device and portable devices having a program upgrade function.

2. Discussion of Related Art

In general, in order to upgrade a program such as a navigation program or firmware of a portable device, a user has to visit a service provider or download the program via the Internet after the user moves to a place in which it is possible to access the Internet. Therefore, it may be inconvenient for the user to upgrade the program of the portable device, and also, upgrading the program may waste time.

SUMMARY OF THE INVENTION

The present invention is directed to provide a portable device having a program upgrade function for enhancing user convenience in upgrading a program and reducing upgrade time.

The present invention is also directed to provide a method of upgrading a program of a portable device for enhancing user convenience in upgrading a program and reducing upgrade time.

In example embodiments, a portable device having a program upgrade function includes: a wireless communicator configured to perform a wireless communication with a plurality of portable devices within a predetermined range; and a controller configured to control the wireless communicator to detect the portable devices within the predetermined range, and configured to check a program version information, which is received through the wireless communicator, of at least one of the portable devices within the predetermined range to upgrade a program. The controller may include: a detection module configured to control the wireless communicator to detect the portable devices within the predetermined range; and a program module configured to check the program version information of the at least one portable device within the predetermined range to upgrade the program. The program module may check the program version information of the at least one portable device within the predetermined range, requests the at least one portable device to transmit a program file of the at least one portable device when a program version of the at least one portable device is newer than a version of the program, and upgrades the program using the program file transmitted from the at least one portable device. The controller may include: a detection module configured to control the wireless communicator to detect the portable devices within the predetermined range; and a program module configured to check the program version information of the at least one portable device within the predetermined range, configured to request the at least one portable device to transmit a program file of the at least one portable device when a program version of the at least one portable device is newer than a version of the program, and configured to upgrade the program using the program file transmitted from the at least one portable device. The portable devices that transmits the program file and the portable device that receives the program file may be in movement. The program may include a program related to a type of the portable device. The program may include a firmware program. The program may include a program not related to a type of the portable device. The program may include a navigation program. The portable device may perform a Ultra Wideband (UWB) communication with the portable devices within the predetermined range through the wireless communicator.

In other example embodiments, a method of upgrading a program of a portable device includes: detecting second portable devices within a first range from the first portable device; receiving a first program version information from at least one of the detected second portable devices; checking the received program version information; requesting the at least one of the second portable devices that transmits the program version information to transmit a second program corresponding to the received program version information when a version of the received program version information represents that the first program of the first portable device is able to be upgraded; receiving the second program corresponding to the received program version information from the at least one of the second portable devices; and upgrading the first program of the first portable device based on the received second program. The requesting the at least one of the second portable devices may include requesting the at least one of the second portable devices that transmits the received program version information to transmit the second program corresponding to the received program version information when the version obtained from the received program version information is newer than a version of the first program of the first portable device. The portable devices that transmit and receives the first and second programs may be in movement. The method may further include checking a type of the at least one of the second portable devices. The first program may include a program related to a type of the first portable device. The first program may include a firmware program. The first program may include a program not related to a type of the first portable device. The first program may include a navigation program. The first portable device may be coupled to the second portable devices through a Ultra Wideband (UWB) communication. The method may further include: detecting, at the at least one of the detected second portable device, a third portable devices within a second range from the at least one of the detected second portable device when a version of the received program version information represents that the first program of the first portable device is not able to be upgraded based on the received second program; receiving, at the at least one of the detected second portable device, a program version information from at least one of the detected third portable devices; checking, at the at least one of the detected second portable device, the program version information received from the detected at least one of the third portable devices; requesting, at the at least one of the detected second portable device, one of the detected at least one of the third portable devices that transmits the received program version information to transmit a third program corresponding to the received program version information when a version of the program version information received from the detected at least one of the third portable devices represents that the first program of the first portable device is able to be upgraded based on the received third program; and receiving, at the at least one of the detected second portable device, the third program corresponding to the received program version information from the one of the detected at least one of the third portable devices that transmits the received program version information. The detected at least one of the second portable devices may be coupled with the third portable devices through a Ultra Wideband (UWB) communication.

The term "program" includes a program, e.g., firmware, directly related to the type of a portable device, and a program not directly related to the type of the portable device but stored in the portable device.

BRIEF DESCRIPTION OF THE DRAWINGS

The above and other objects, features and advantages of the present invention will become more apparent to those of ordinary skill in the art by describing in detail example embodiments thereof with reference to the attached drawings, in which:

FIG. 8 is a flowchart illustrating a method of upgrading a program according to a fourth example embodiment of the present invention; and FIG. 9 is a flowchart illustrating a method of upgrading a program according to a fifth example embodiment of the present invention.

DETAILED DESCRIPTION OF EXAMPLE EMBODIMENTS

Hereinafter, example embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
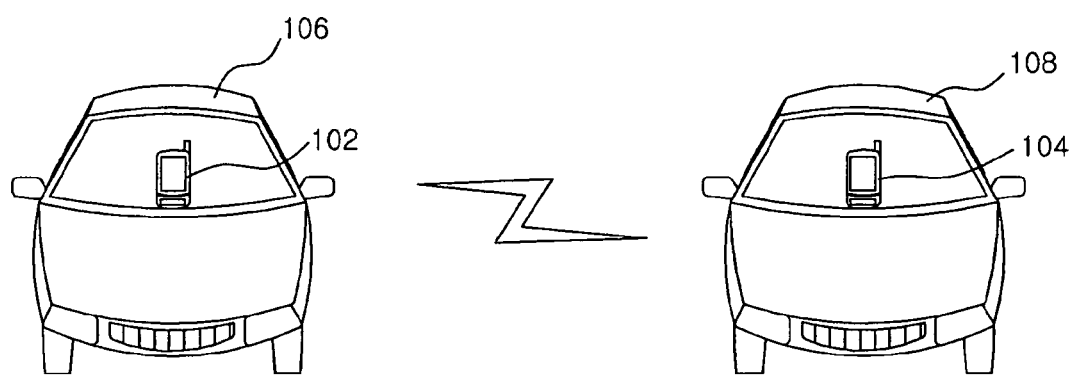
FIG. 1 illustrates a system for upgrading a program according to a first example embodiment of the present invention.

FIG. 1 illustrates a system for upgrading a program according to a first example embodiment of the present invention.

Referring to FIG. 1, a system 100 for upgrading a program according to the first example embodiment of the present invention includes a first portable device 102 and a second portable device 104.

The first and second portable devices 102 and 104 exchange a predetermined program with each other. The first and second portable devices 102 and 104 may exchange the program wirelessly, e.g., by Ultra Wideband (UWB) communication. The first and second portable devices 102 and 104 may be, for example, a mobile communication device, a personal computer, a Personal Digital Assistant (PDA), a navigation device, and so on.

In addition, the first and second portable devices 102 and 104 may be installed in a first mobile body 106 and a second mobile body 108, such as a vehicle, respectively. Also, people may carry the first and second portable devices 102 and 104. The first and second portable devices 102 and 104 transmit and receive the program with each other during movement, which will be described in detail below with reference to the attached drawings.

Figure 2:
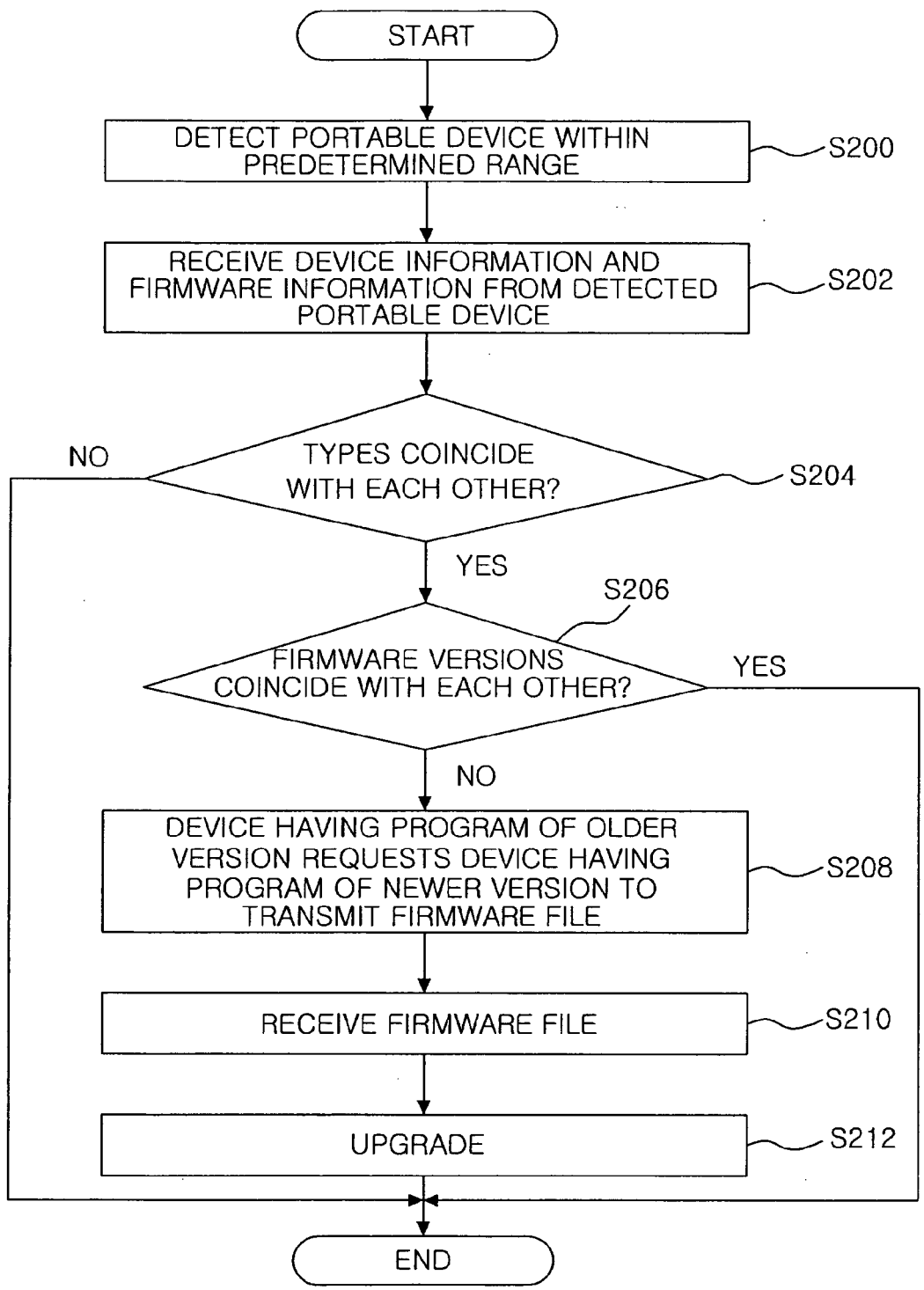
FIG. 2 is a flowchart illustrating a method of upgrading a program according to a first example embodiment of the present invention.

FIG. 2 is a flowchart illustrating a method of upgrading a program according to a first example embodiment of the present invention.

Referring to FIG. 2, the first portable device 102 in movement detects portable devices within a predetermined range (step S200). For example, when a user moves by car with the first portable device 102, the user may transmit, using the first portable device 102, a detection signal to the second portable device 104 among portable devices installed in other cars in movement within the predetermined range from the user's car. Here, the detection signal requests to transmit information on a type of a portable device and a program, e.g., firmware required for directly operating the portable device, related to the type of the portable device. A process of upgrading a program will be described using, as an example, the second portable device 104 among the portable devices installed in other cars.

Subsequently, the first portable device 102 receives information on a type and firmware of the second portable device 104 from the second portable device 104 (step S 202).

The first portable device 102 determines whether or not the type of the second portable device 104 coincides with a type of the first portable device 102 on the basis of the type information of the second portable device 104 transmitted from the second portable device 104 (step S 204).

When the types of the first and second portable devices 102 and 104 do not coincide with each other, the second portable device 104 cannot upgrade firmware of the first portable device 102 with the firmware of the second portable device 104, and thus the program upgrade process is terminated.

On the other hand, when the types of the first and second portable devices 102 and 104 coincide with each other, it is determined whether or not a firmware version of the first portable device 102 coincides with that of the second portable device 104 (step S 206).

When the firmware version of the first portable device 102 coincides with that of the second portable device 104, it is not necessary to upgrade the firmware of the first portable device 102 with that of the second portable device 104, and thus the program upgrade process is terminated.

On the other hand, when the firmware version of the first portable device 102 is different from that of the second portable device 104, and in particular, the firmware version of the first portable device 102 is older than that of the second portable device 104, the first portable device 102 requests the second portable device 104 to transmit a firmware file (step S 208). Here, the first and second portable devices 102 and 104 may transmit and receive a signal with each other wirelessly, e.g., by UWB communication.

UWB communication is performed in a wide frequency band between about 3.1 GHz and about 10.6 GHz at a transmission rate of 100 Mbps or more, and thus shows low power density in a frequency domain. Therefore, when a UWB signal overlaps another communication signal, almost no interference occurs between the UWB signal and the other communication signal. Consequently, when wireless communication is performed between the first and second portable devices 102 and 104 in movement, UWB communication may be used due to little interference and a high transmission rate.

Subsequently, the first portable device 102 receives a firmware file of the second portable device 104 from the second portable device 104 (step S 210). According to another example embodiment of the present invention, the second portable device 104 may transmit an upgrade file required for upgrade to the first portable device 102 in response to the request.

Then, the first portable device 102 upgrades firmware of the first portable device 102 using the firmware file transmitted from the second portable device 104 (step S 212).

In brief, according to the example embodiment of the method of upgrading a program, the first portable device 102 can upgrade firmware of the first portable device 102 using the second portable device 104 within the predetermined range. When a user uses a program upgrade method according to an example embodiment of the present invention, the user can upgrade a program, such as firmware, etc., of his/her own portable device without visiting a service provider or without accessing a server via the Internet. Therefore, user convenience may be enhanced, and time for upgrading a program may be reduced because there is no need to visit a service provider.

In the above description, the first portable device 102 simultaneously requests type information and firmware information of another portable device while detecting portable devices within the predetermined range. However, the detection process, the type information request process and the firmware information request process may be separately performed.

Figure 3:
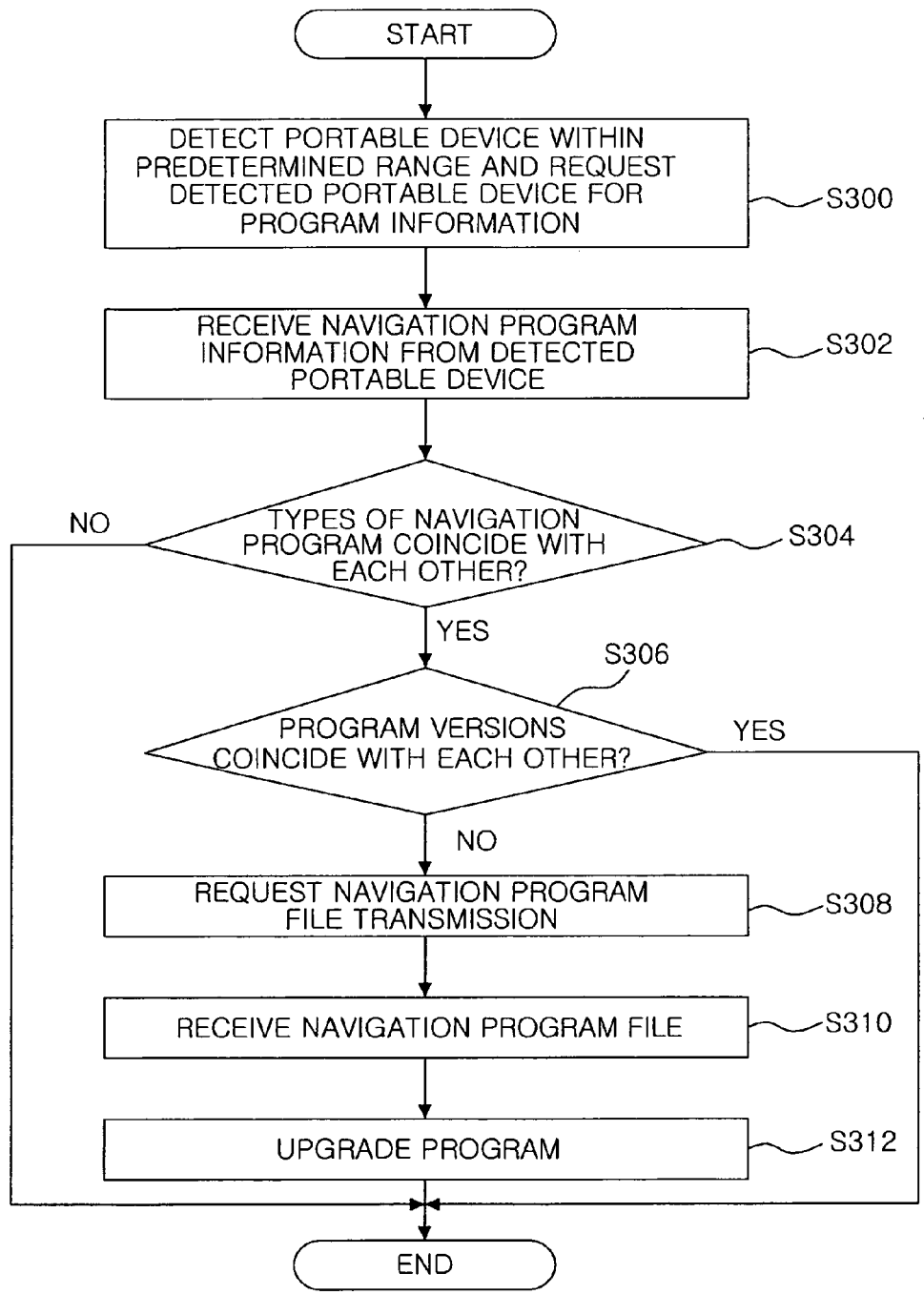
FIG. 3 is a flowchart illustrating a method of upgrading a program according to a second example embodiment of the present invention.

FIG. 3 is a flowchart illustrating a method of upgrading a program according to a second example embodiment of the present invention.

Referring to FIG. 3, the first portable device 102 detects portable devices within a predetermined range and requests the detected portable devices for information on a program not directly related to a type of the detected portable devices (step S 300). A process of upgrading a program will be described on the assumption that the second portable device 104 transmits the information on a program to the first portable device 102 and the program is a navigation program.

Subsequently, the second portable device 104 transmits information on navigation program of the second portable device 104 to the first portable device 102 in response to the request (step S 302).

Then, it is determined based on a navigation program installed on the first portable device 102 and the navigation program information received from the second portable device 104 whether a type of the navigation program installed on the second portable device 104 coincides with that of the navigation program installed on the first portable device 102 (step S 304). According to, for example, whether or not a publishing company of a navigation map used by the first portable device 102 is the same as that of a navigation map used by the second portable device 104, it can be determined whether or not the types of the navigation programs coincide with each other.

When the types of the navigation programs of the first and second portable devices 102 and 104 are different from each other, it is not possible to upgrade the navigation program of the first portable device 102 with the navigation program of the second portable device 104, and thus the program upgrade process is terminated.

On the other hand, when the types of the navigation programs of the first and second portable devices 102 and 104 coincide with each other, it is determined whether versions of the navigation programs of the first and second portable devices 102 and 104 coincide with each other (step S 306).

When versions of the navigation programs of the first and second portable devices 102 and 104 coincide with each other, it is not necessary to upgrade the navigation program of the first portable device 102, and thus the program upgrade process is terminated.

On the other hand, when versions of the navigation programs of the first and second portable devices 102 and 104 are different from each other, and in particular, the version of the navigation program of the first portable device 102 is older than that of the navigation program of the second portable device 104, the first portable device 102 requests the second portable device 104 to transmit a navigation program file (step S 308).

Subsequently, the second portable device 104 transmits the navigation program file to the first portable device 102 in response to the request, and the first portable device 102 receives the navigation program from the second portable device 104 (step S 310). According to another example embodiment of the present invention, the second portable device 104 may transmit an upgrade file required for upgrade to the first portable device 102 in response to the request.

Then, the first portable device 102 upgrades navigation program of the first portable device 102 using the navigation program file transmitted from the second portable device 104 (step S 312).

Figure 4:
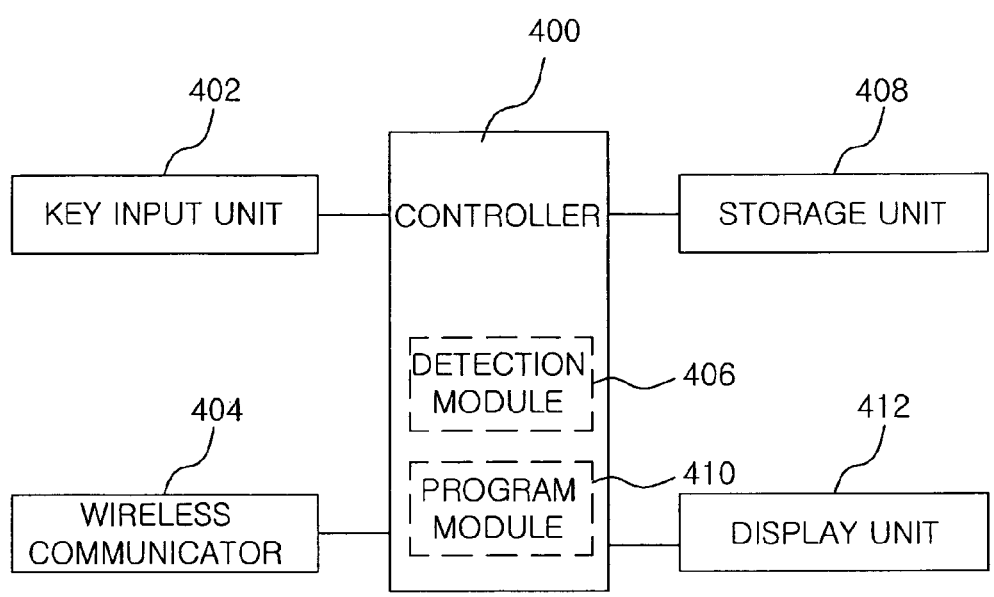
FIG. 4 is a block diagram of a first device of FIG. 1 according to an example embodiment of the present invention.

FIG. 4 is a block diagram of the first device 102 of FIG. 1 according to an example embodiment of the present invention.

Referring to FIG. 4, the first portable device 102 according to an example embodiment includes a controller 400, a key input unit 402, a wireless communicator 404, a storage unit 408, a program module 410, and a display unit 412. Here, the controller 400 may include a detection module 406 and the program module 410.

The key input unit 402 receives a signal input by a user and provides the input signal to the controller 400. The key input unit 402 may include key buttons for receiving the input signal, and the key buttons may be implemented as a keypad or a touch screen.

The wireless communicator 404 performs wireless communication, e.g., UWB communication, with the second portable device 104 among other portable devices within a predetermined range from the first portable device 102.

The controller 400 controls the overall operation of respective components of the first portable device 102. The detection module 406 transmits a detection signal to portable devices to detect the portable devices within the predetermined range from the first portable device 102. The detection module 406 may be implemented as a software program to perform the detection function, and the software program may be stored in the storage unit 408. The detection module 406 also may be implemented as a digital signal processor performing the detection function. The detection module 406 also may be implemented as a separate digital signal processor performing the detection function outside the controller 400.

The program module 410 upgrades the corresponding program using a program file transmitted from the second portable device 104. The program module 410 may be implemented as a software program performing the upgrade operation, and the software program may be stored in the storage unit 408. The program module 410 also may be implemented as a digital signal processor performing the upgrade operation. The program module 410 also may be implemented as a separate digital signal processor performing the upgrade operation outside the controller 400.

The storage unit 408 stores a variety of program files and data. The storage unit 408 may be implemented as, for example, a non-volatile flash memory.

The display unit 412 displays an image according to control of the controller 400. The display unit 412 may be implemented as various devices such as Liquid Crystal Display (LCD), a touch screen, and so on.

Figure 5:
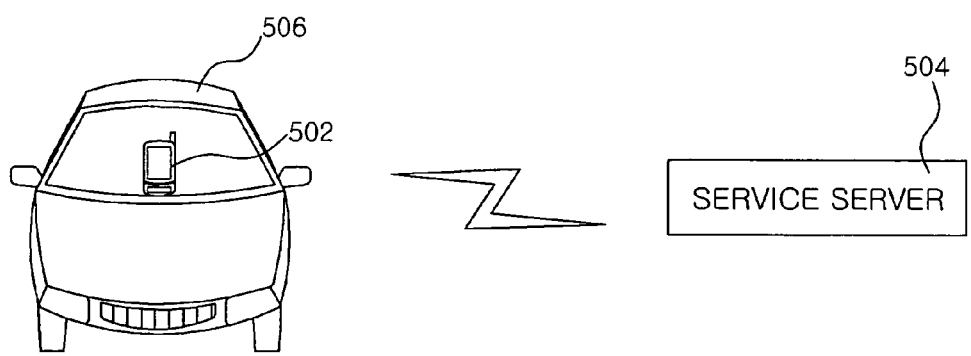
FIG. 5 illustrates a system for upgrading a program according to a second example embodiment of the present invention.

FIG. 5 illustrates a system for upgrading a program according to a second example embodiment of the present invention.

Referring to FIG. 5, a system 500 for upgrading a program according to the second example embodiment of the present invention includes a portable device 502 and a service server 504.

The portable device 502 is installed in a mobile body 506, and downloads a program file from the service server 504 to upgrade the corresponding program during movement.

The service server 504 is installed and fixed by a communication service provider, and transmits a program file to the portable device 502.

A method of upgrading a program in the program upgrade system will be described in detail below with reference to the attached drawings.

Figure 6:
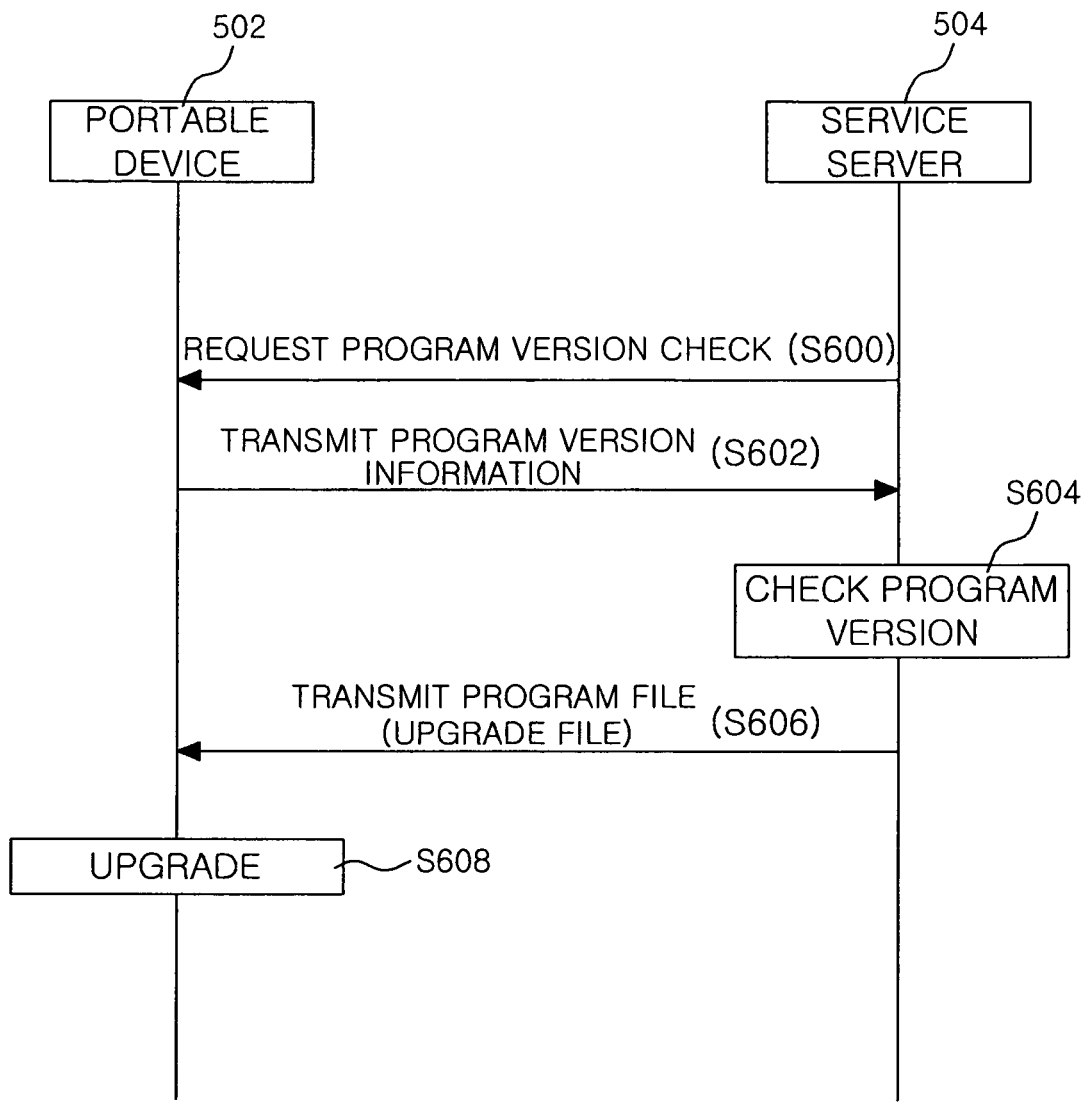
FIG. 6 is a flowchart illustrating a method of upgrading a program according to a third example embodiment of the present invention.

FIG. 6 is a flowchart illustrating a method of upgrading a program according to a third example embodiment of the present invention.

Referring to FIG. 6, the service server 504 detects portable devices moving into a predetermined range and requests one of the detected portable devices, for example, the portable device 502 to check a version of a predetermined program, e.g., a navigation program or firmware (step S 600).

Then, the portable device 502 transmits information on a version of the program to the service server 504 in response to the request (step S 602).

Subsequently, the service server 504 determines, based on the transmitted program version information, whether or not the program version of the portable device 502 is the latest (step S 604).

When the program version of the portable device 502 is the latest, the portable device 502 does not need to upgrade the program, and thus the program upgrade process is terminated.

On the other hand, when the program version of the portable device 502 is not the latest, the service server 504 transmits a latest program file to the portable device 502 (step S 606). Needless to say, the service server 504 may transmit only an upgrade file required for upgrade to the portable device 502.

Subsequently, the portable device 502 upgrades the program using the transmitted program file (step S 608).

The above described method of upgrading a program may be performed between portable devices within a predetermined range using wireless communication, e.g., UWB communication.

A method of upgrading a program beyond a limited range of wireless communication, such as UWB communication, will be described in detail below with reference to the attached drawings.

Figure 7:
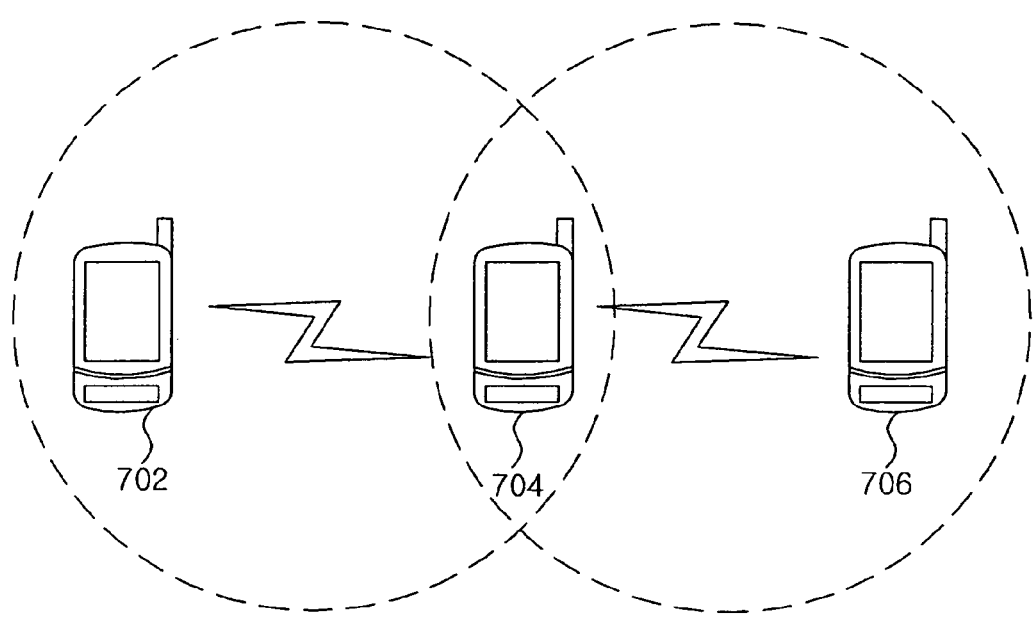
FIG. 7 illustrates a system for upgrading a program according to a third example embodiment of the present invention.

FIG. 7 illustrates a system for upgrading a program according to a third example embodiment of the present invention.

Referring to FIG. 7, a program upgrade system 700 includes a first portable device 702, a second portable device 704 and a third portable device 706.

As illustrated in FIG. 7, the first portable device 702 can perform wireless communication within a predetermined range using wireless communication, e.g., UWB communication. For example, the first portable device 702 can perform wireless communication with the second portable device 704 within the predetermined range. The first portable device 702 cannot perform wireless communication with the third portable device 706, but can download a program from the third portable device 706 using the second portable device 704 to upgrade the program. This will be described in detail below with reference to the attached drawings.

FIG. 8 is a flowchart illustrating a method of upgrading a program according to a fourth example embodiment of the present invention.

Referring to FIG. 8, the first portable device 702 detects portable devices within a predetermined range and requests the detected portable devices to transmit program version information (step S 800). In FIG. 8, the second portable device 704 is illustrated as an example among the detected portable devices.

Subsequently, the detected portable devices including the second portable device 704 transmit their program version information to the first portable device 702 (step S 802).

Then, the first portable device 702 checks the transmitted program version information and determines whether or not a portable device having a program file of a desired version exists (step S 804). Here, the desired version indicates a version with which a program installed on the first portable device 702 can be upgraded, that is, newer than a version of the program of the first portable device 702. For example, when a version obtained from the program version information transmitted from the second portable device 704 is newer than the version of the program installed on the first portable device 702, the first portable device 702 may determine that the second portable device 704 has a program file of a desired version. When the latest program version among the program version information transmitted from the detected portable devices is newer than the version of the program installed on the first portable device 702, the first portable device 702 may determine that a portable device providing the latest program version information has a program file of a desired version.

When the first portable device 702 determines that a portable device having a program file of a desired version does not exist, the first portable device 702 requests the second portable device 704 for program version information of other portable devices, e.g., the third portable device 706, around the second portable device 704 (step S 806). From now, it is assumed that the second portable device 704 is connected with the first portable device 702 by wireless communication.

The second portable device 704 detects portable devices, e.g., the third portable device 706, around the second portable device 704 itself in response to the request of the first portable device 702, and requests the third portable device 706 to transmit program version information (step S 808).

Then, the third portable device 706 transmits program version information of the third portable device 706 to the second portable device 704 in response to the request (step S 810).

Subsequently, the second portable device 704 transmits the program version information of the third portable device 706 to the first portable device 702 (step S 812).

The first portable device 702 checks the program version information of the third portable device 706 transmitted via the second portable device 704. When the program version of the third portable device 706 is newer than that of the first portable device 706, the first portable device 702 requests the third portable device 706 to transmit a program file of the third portable device 706 via the second portable device 704 (steps S814 and S816).

The third portable device 706 transmits the program file to the first portable device 702 via the second portable device 704 in response to the request (steps S818 and S820).

Subsequently, the first portable device 702 upgrades program of the first portable device 702 using the transmitted program file (step S 822).

FIG. 9 is a flowchart illustrating a method of upgrading a program according to a fifth example embodiment of the present invention.

Referring to FIG. 9, the first portable device 702 detects portable devices within a predetermined range and requests the detected portable devices to transmit program version information (step S 900). In FIG. 9, the second portable device 704 is illustrated as an example among the detected portable devices.

Subsequently, the detected portable devices including the second portable device 704 transmit their program version information to the first portable device 702 (step S 902).

Then, the first portable device 702 checks the transmitted program version information and determines whether or not a portable device having a program file of a desired version exists (step S 904). Here, the desired version indicates a version with which a program installed on the first portable device 702 can be upgraded, that is, newer than a version of the program of the first portable device 702. For example, when a version obtained from the program version information transmitted from the second portable device 704 is newer than the version of the program installed on the first portable device 702, the first portable device 702 may determine that the second portable device 704 has a program file of a desired version. When the latest program version among the program version information transmitted from the detected portable devices is newer than the version of the program installed on the first portable device 702, the first portable device 702 may determine that a portable device providing the latest program version information has a program file of a desired version.

When it is determined that a portable device having a program file of a desired version does not exist, the first portable device 702 provides the version information of the program installed on the first portable device 702 itself to the second portable device 704, requests the second portable device 704 to detect other portable devices, e.g., the third portable device 706, around the second portable device 704, and requests the second portable device 704 for program version information of other portable devices, e.g., the third portable device 706 (step S 906). From now, it is assumed that the second portable device 704 is connected with the first portable device 702 by wireless communication.

The second portable device 704 detects portable devices, e.g., the third portable device 706, around the second portable device 704 itself in response to the request of the first portable device 702, and requests the third portable device 706 to transmit program version information of the third portable device 706 (step S 908).

Then, the third portable device 706 transmits program version information of the third portable device 706 to the second portable device 704 (step S 910).

Subsequently, the second portable device 704 checks the transmitted program version information of the third portable device 706 to determine whether or not a portable device having a program file of a desired version exists (step S 912). Here, the desired version indicates a version with which the program installed on the first portable device 702 can be upgraded, that is, newer than a version of the program of the first portable device 702. For example, when a version obtained from the program version information transmitted from the third portable device 706 is newer than the version of the program installed on the first portable device 702, the second portable device 704 may determine that the third portable device 706 has a program file of a desired version.

When the latest program version among the program version information transmitted from the detected portable devices is newer than the version of the program installed on the first portable device 702, the second portable device 704 may determine that a portable device providing the latest program version information has a program file of a desired version.

From now, it is assumed that the third portable device 706 has a program file of a desired version.

Subsequently, when the third portable device 706 has a program file of a desired version, the second portable device 704 requests the third portable device 706 to transmit the program file (step S 914).

Then, the third portable device 706 transmits the program file to the second portable device 704 in response to the request (step S 916).

The second portable device 704 transmits the program file transmitted from the third portable device 706 to the first portable device 702 (step S 918).

Subsequently, the first portable device 702 upgrades the program using the transmitted program file (step S 920).

In the above described example embodiments, a program is exchanged between portable devices by UWB communication. However, the present invention is not limited to UWB communication but can also use other short-range wireless communication.

In the above described example embodiments, mobile communication devices are used as examples of portable devices, but the inventive method of upgrading a program can be applied to various portable devices, such as a PDA, a portable multimedia player, etc., as well as a mobile communication device.

As described above, a method of upgrading a program of a portable device and a portable device having a program upgrade function according to example embodiments of the present invention upgrade a program such as a navigation program or firmware of the portable device using another portable device within a predetermined range, thus enhancing user convenience.

In addition, a program, such as a navigation program or firmware of a portable device, is upgraded using another portable device within a predetermined range without visiting a service provider or downloading the program via the Internet after moving to a place in which it is possible to access the Internet. Thus, time taken for program upgrade can be reduced. In particular, program upgrade can be performed between portable devices in movement, that is, it is possible to upgrade a program of a portable device regardless of a place.

While the invention has been shown and described with reference to certain example embodiments thereof, it will be understood by those skilled in the art that various changes in form and details may be made therein without departing from the spirit and scope of the invention as defined by the appended claims.

What is claimed is:

1. A portable device having a program upgrade function, comprising:
 a wireless communicator configured to perform a wireless communication with a first portable device, a second portable device and a third portable device, each of the first, the second and the third portable devices, being of a same type of device, has a first, a second, and a third program upgrade function, within a first, a second, and a third set range, respectively; and
 a controller configured to control the wireless communicator to detect the first, the second, and the third portable devices within the corresponding set ranges, and configured to check a program version information, which is received through the wireless communicator, of at least one of the first, the second, and the third portable devices within the corresponding set ranges to upgrade a program transmitted from the at least one of the first, the second, and the third portable devices having the corresponding program upgrade functions, wherein:

the detected second portable device detects the third portable device within the second set range from at least the detected second portable device when a version of a received first program version information of the first portable device is not able to be upgraded based on the received second program upgrade function, the detected second portable device receives a third program version information from at least the detected third portable device within the second set range, the detected second portable device checks the third program version information received from the detected third portable device, the detected second portable device request the detected third portable device to transmit the third program upgrade function corresponding to the received first program version information when a version of the third program version function information received from the detected third portable device represents that the first program upgrade function of the first portable device is able to be upgraded based on the received third program upgrade function, the detected second portable device receives the third program upgrade function corresponding to the received first program version information from the detected third portable device that transmits the received third program version information, and the detected first portable device is upgraded based on the third program upgrade function of the detected third portable device wherein the received third program upgrade function is transmitted from the detected second portable device within the first set range to the detected first portable device which is outside of the third set range.

2. The portable device of claim 1, wherein the controller comprises:

a detection module configured to control the wireless communicator to detect the first, the second, and the third portable devices within the corresponding set ranges; and a program module configured to check the program version information of the at least one of the first, the second, and the third portable devices within the corresponding set range to upgrade the program.

3. The portable device of claim 2, wherein the program module checks the program version information of the at least one of the first, the second, and the third portable devices within the corresponding set range, requests the at least one of the first, the second, and the third portable devices to transmit a program file of the at least one of the first, the second, and the third portable devices when a program version of the at least one of the first, the second, and the third portable devices is newer than a version of the program, and upgrades the program using the program file transmitted from the at least one of the first, the second, and the third portable devices.

4. The portable device of claim 1, wherein the controller comprises:

a detection module configured to control the wireless communicator to detect the the first, the second, and the third portable devices within the corresponding set range; and a program module configured to check the program version information of the at least one of the first, the second, and the third portable devices within the corresponding set range, configured to request the at least one of the first, the second, and the third portable devices to transmit a program file of the at least one of the first, the second, and the third portable devices when a program version of the at least one of the first, the second, and the third portable devices is newer than a version of the program, and configured to upgrade the program using the program file transmitted from the at least one of the first, the second, and the third portable devices.

5. The portable device of claim 1, wherein the first program upgrade function includes a program related to a type of portable device.

6. The portable device of claim 5, wherein the first program upgrade function includes a firmware program.

7. The portable device of claim 1, wherein the first program upgrade function includes a program not related to a type of portable device.

8. The portable device of claim 7, wherein the first program upgrade function includes a navigation program.

9. The portable device of claim 3, wherein at least one of the first, the second, and the third portable devices performs a Ultra Wideband (UWB) communication within the corresponding set ranges through the wireless communicator.

10. A method of upgrading a program of portable devices, the method comprising:

performing a wireless communication with a first portable device, a second portable device, and a third portable device, each of the first, the second and the third portable devices, being of a same type of device, has a first, a second, and a third program upgrade function, within a first, a second, and a third set range, respectively;

detecting one of the first, the second, and the third portable device, within the corresponding set range from one of the first, the second, the third portable device;

receiving a first program version information from at least one of the detected first, second, and third portable devices;

checking the received first program version information;

requesting the at least one of the first, the second, and the third portable devices that transmits the first program version information to transmit a second program version information corresponding to the received first program version information when a version of the received first program version information of the first portable device is able to be upgraded;

receiving the second program version information corresponding to the received first program version information from the at least one of the first, the second, and the third portable devices;

detecting, at the detected second portable device, the third portable device within the second set range from at least the detected second portable device when a version of the received first program version information of the first portable device is not able to be upgraded based on the received second program upgrade function;

receiving, at the detected second portable device, a third program version information from at least the detected third portable device;

checking, at the detected second portable device, the third program version information received from the detected third portable device;

requesting, at the detected second portable device, the detected third portable device to transmit the third program upgrade function corresponding to the received first program version information when a version of the third program version function information received from the detected third portable device represents that the first program upgrade function of the first portable device is able to be upgraded based on the received third program upgrade function;

receiving, at the detected second portable device, the third program upgrade function corresponding to the received first program version information from the detected third portable device that transmits the received third program version information; and upgrading the detected first portable device based on the third program upgrade function of the third portable device wherein the received third program upgrade function is transmitted from the detected second portable device within the first set range to the detected first portable device which is outside of the third set range.

11. The method of claim 10, wherein the requesting the at least one of the first, the second, and the third portable devices that transmits the received first program version information to transmit the second program upgrade function corresponding to the received first program version information is performed when the version obtained from the received first program version information is newer than a version of the first program version information of the first portable device.

12. The method of claim 10, further comprising:
checking a type of the at least one of the first, the second, and the third portable devices.

13. The method of claim 12, wherein the first program upgrade function includes a program related to a type of portable device.

14. The method of claim 13, wherein the first program upgrade function includes a firmware program.

15. The method of claim 12, wherein the first program upgrade function includes a program not related to a type of portable device.

16. The method of claim 15, wherein the first program upgrade function includes a navigation program.

17. The method of claim 10, wherein the first portable device is coupled to the second portable device and the third portable device through a Ultra Wideband (UWB) communication.

18. The method of claim 10, wherein the detected second portable device is coupled with the third portable device through a Ultra Wideband (UWB) communication.

* * * * *

UNITED STATES PATENT AND TRADEMARK OFFICE
CERTIFICATE OF CORRECTION

| | | |
|---|---|---|
| PATENT NO. | : 8,484,633 B2 | Page 1 of 1 |
| APPLICATION NO. | : 12/078136 | |
| DATED | : July 9, 2013 | |
| INVENTOR(S) | : Kim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1204 days.

Signed and Sealed this
Fourth Day of August, 2015

Michelle K. Lee
*Director of the United States Patent and Trademark Office*